Nov. 4, 1969    R. D. SMITH    3,476,303
COLLAPSIBLE RECEPTACLE

Filed Oct. 13, 1967    2 Sheets-Sheet 1

RICHARD D. SMITH
*INVENTOR.*

BY *Steven F. Stone*

ATTORNEY

RICHARD D. SMITH
*INVENTOR.*

BY *Steven F. Stone*

ATTORNEY

United States Patent Office 3,476,303
Patented Nov. 4, 1969

3,476,303
COLLAPSIBLE RECEPTACLE
Richard Dunham Smith, 2415 S. Court,
Palo Alto, Calif. 94301
Filed Oct. 13, 1967, Ser. No. 675,082
Int. Cl. B65d 5/24
U.S. Cl. 229—31   8 Claims

ABSTRACT OF THE DISCLOSURE

A collapsible receptacle adapted to fit within the cargo compartment of a station wagon comprising a rectangular base having front, rear and two side walls rotatably extending from the base and coextensive with the edges thereof, the walls being movable from a plane substantially parallel to the base to planes substantially normal thereto. The sides of the front wall are joined to the front edges of the side walls and the front wall is foldable to provide for collapsing of the receptacle. Collapsible web means connect to the side edges of the rear wall to rearward edges of the side walls, the web means being extended when the rear wall is in the plane of the base and being folded when the rear wall is in the vertical position. Fastening means are provided for maintaining the rear wall in the vertical position.

BACKGROUND OF THE INVENTION

Station wagon type passenger vehicles which are characterized by an enclosed flat bed cargo compartment, access to which is had through the rear of the vehicle, are finding increased acceptance by the car buying public. These vehicles combine the passenger carrying ability of the conventional sedan with an increased load carrying capability. Unfortunately, certain chores for which the station wagon can be used such as carrying trash, rubbish, leaves, lawn clippings, earth and firewood, for example, result in an untoward amount of dirt and contamination in the cargo compartment which may materially interfere with the passenger carrying capability of the vehicle. According to this invention a light-weight collapsible receptacle is provided which is sized to be received within the cargo compartment of a station wagon. The rear wall is adapted to permit loading of the receptacle with the wall in the lowered position and may be raised and fastened in the upright position. The interior surface of the receptacle is substantially continuous in order to prevent leakage of dirt through the interfaces between the various walls and the base. The receptacle also collapses into a compact configuration for easy storage. It is accordingly an object of this invention to provide a collapsible receptacle for the cargo compartment of a station wagon.

It is another object of this invention to provide means for preventing leakage from a collapsible receptacle. It is another object of this invention to provide a blank for convenient assembly of a collapsible receptacle. These and other objects of this invention will be readily apparent from the following description with reference to the accompanying drawings wherein.

DESCRIPTION OF THE INVENTION

Figure 1:
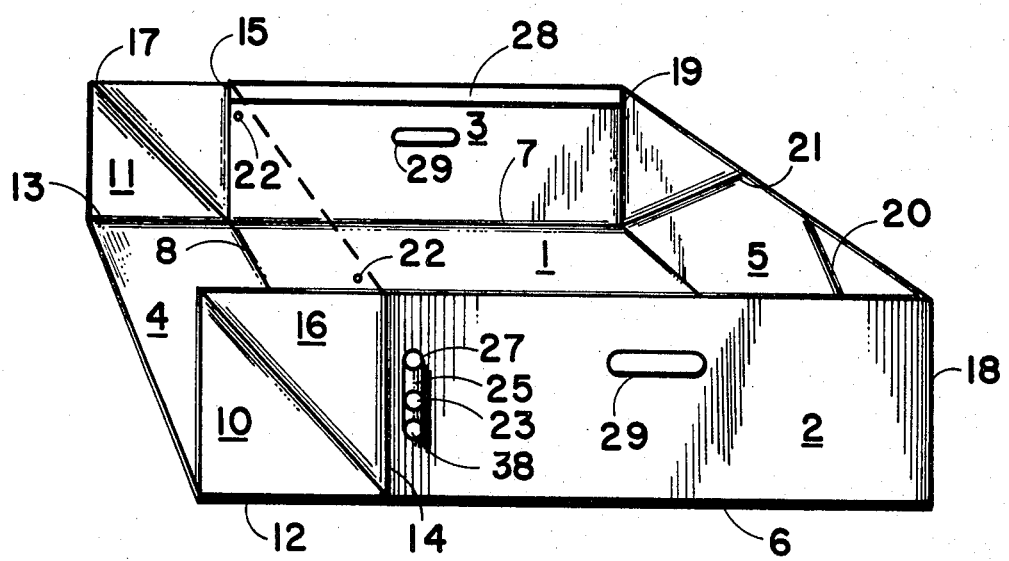
FIGURE 1 is a perspective view of an embodiment of this invention.
Figure 2:
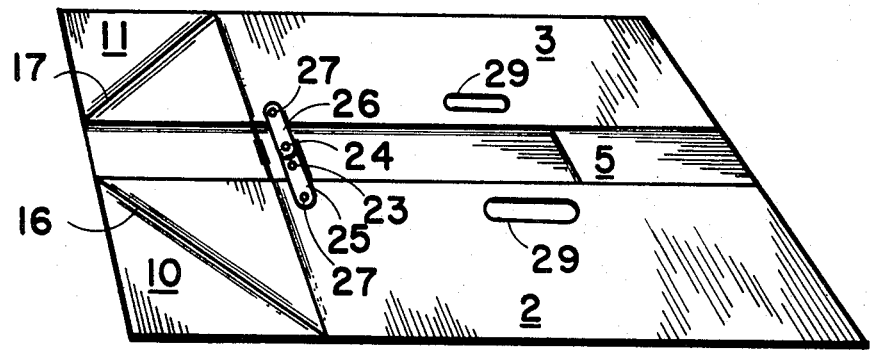
FIGURE 2 is a view of the embodiment of FIGURE 1 in collapsed form.

Referring now to FIGURES 1 and 2, a collapsible receptacle according to this invention is shown. The receptacle can be formed of various light-weight, sturdy materials such as cardboard, corrugated paper-board, sheet metal, plastic, and wood, for example. A particularly satisfactory material is a corrugated paper board, 350# test, C-flute, with a curtain coat on both sides for water resistance such as is manufactured by Container Corporation of America and this invention will be described with respect to such material. The material has adequate strength, and accepts folds and crease lines readily thereby simplifying fabrication. It should be understood, however, that if materials are used which are not readily folded and creased the function of the various folds and creases hereinafter described can be obtained by various equivalent means such as tape seams, joining separate pieces, for example.

The receptacle of this invention comprises a rectangular base 1 of a size adapted to be received within the flat bed portion of the cargo compartment of a station wagon. Side walls 2 and 3, rear wall 4 and front wall 5 extend from base 1 and are coextensively connected thereto by folds or seams 6, 7, 8, and 9 respectively. All walls are of equal height and are capable of being received within the cargo compartment when in the upright position and the front and rear designations refer to the orientation of the receptacle in the vehicle.

Web means 10 and 11 coextensively connect the side edges of rear wall 4 to the rear edges of side walls 2 and 3 through folds or seams 12, 13, 14, and 15. If web means 10 and 11 are made from the same material as the rear wall, fold means 16 and 17 are provided to permit the web means to fold within the confines of the receptacle when wall 4 is raised to the vertical positions shown by the dotted lines in FIGURE 1. If desired, however, web means 10 and 11 can be made from a flexible material such as canvas, for example, and specific fold lines need not be employed. The side edges of front wall 5 are coextensively connected to the front edges of side walls 2 and 3 by seams or folds 18 and 19. If front wall 5 is fabricated from a rigid material, fold means 20 and 21 are provided to permit the front wall 5 to collapse under side walls 2 and 3 as shown in FIGURE 2. Front wall 5 however can be fabricated from a flexible material in which case specific fold means are not required.

Fastening means are provided for maintaining rear wall 4 in the vertical position. Various fastening means can be employed; a preferred embodiment employing male snap fasteners 22 on rear wall 4 and female snap fasteners 23 and 24 on flexible straps 25 and 26 affixed to walls 2 and 3 by rivets 27. Strap 25 is also fitted with a male snap fastener 38 which engages female fastener 24 on strap 26 to maintain the receptacle in collapsed configuration as shown in FIGURE 2. For added strength reinforcing means 28 can be employed on side walls 2 and 3. Handles can also be incorporated on the receptacle for added ease of handling such as by handholds 29 cut through walls 2 and 3 below reinforcement 28.

In operation the receptacle would be opened from the position of FIGURE 2 to that of FIGURE 1 and filled with wall 4 in the lowered position. The receptacle can either be loaded before being placed in the vehicle or can be loaded in the vehicle through the rear gate. When the box is loaded to the desired amount wall 4 is raised and fastened in the upright position. The interior of the vehicle is thereby kept clean and the receptacle itself can later be hosed down for cleaning purposes.

The novel construction of the invention eliminates any open interfaces between the walls and the base thereby preventing the contents of the receptacle from contaminating the interior of the vehicle. This novel construction also permits the rear wall to be raised and lowered while the remaining walls are in the upright position, while at the same time permitting the recpetacle to be collapsed into a compact configuration for storage.

Figure 3:
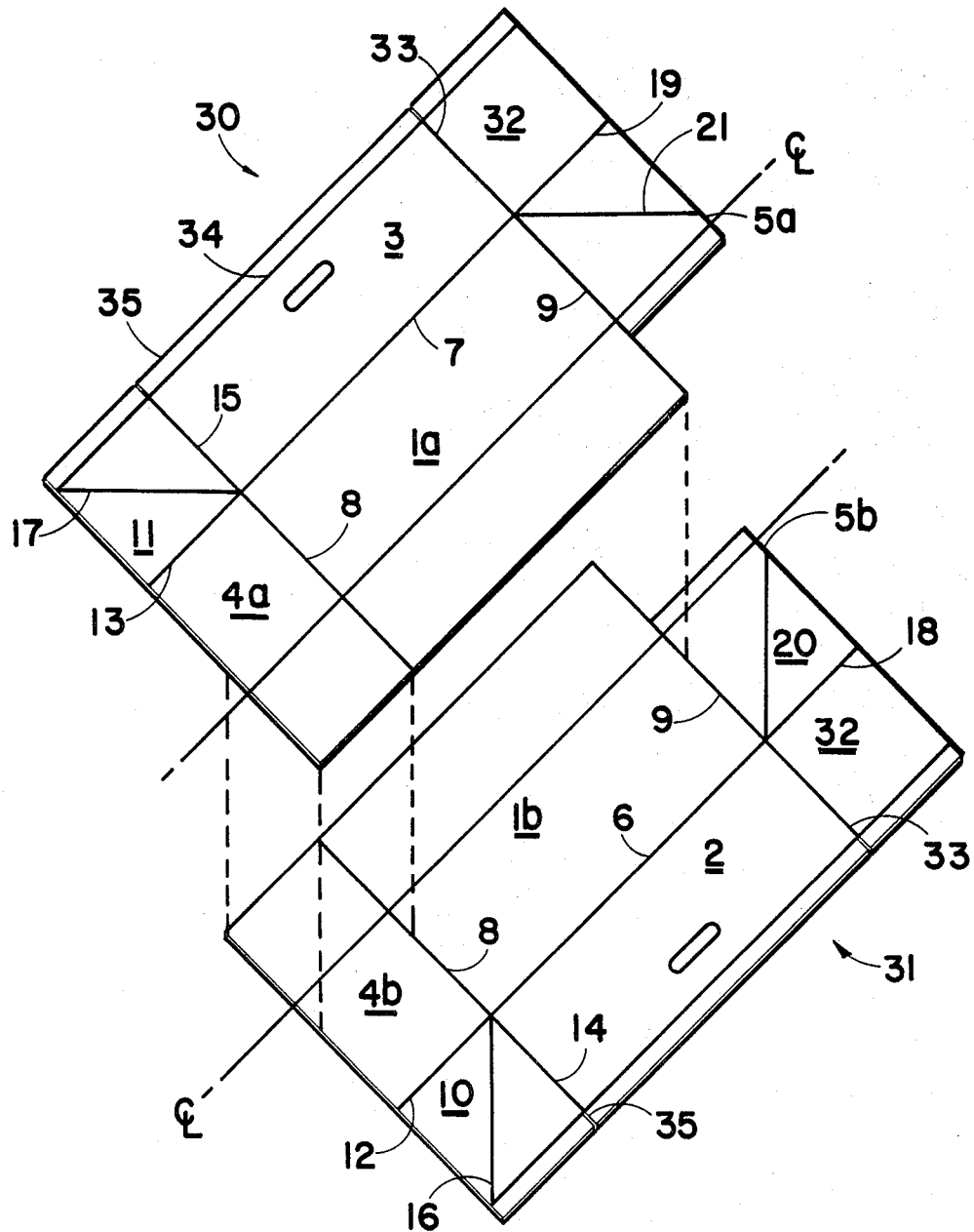
FIGURE 3 is an exploded view showing the assembly of a preferred embodiment of this invention.

Referring now to FIGURE 3, an exploded view illustrates the assembly of a preferred embodiment of this invention.

The receptacle is fabricated from two mirror image blanks 30 and 31 which are oriented with base forming portions 1a and 1b in partially overlapping relationship and stapled together. All cuts and fold lines are made in blanks 1a and 1b prior to assembly. Fold lines 6, 7, 8, 9, 12, 13, 14, 15, 16, 17, 18, 19, 20, and 21 correspond in number to those shown in FIGURES 1 and 2. Tab portions 32 extend from front wall forming portions 5a and 5b and are cut from side walls 2 and 3 by cuts 33. Folds 34 are provided in side walls 2 and 3 whereby reinforcement 28 can be formed by doubling over the wall and stapling the doubled over portion to walls 2 and 3. Cuts 35 are made to permit easy folding of webs 10 and 11. Rear wall forming portions 4a and 4b and front wall forming portions 5a and 5b are also stapled together through their overlapping positions. Tabs 32 are bent upwards along lines 18 and 19 and portions 5a and 5b are bent upward along line 4 bringing tabs 32 in juxtaposition to walls 2 and 3. Tabs 32 are then stapled to walls 2 and 3, becoming part thereof to complete the major assembly of the receptacle. Fasteners are then added to complete the receptacle. This mode of assembly improves the strength of the receptacle by providing additional strength through the overlapping of portions of the base, front, and rear walls and thereby providing additional thickness in the side walls at tabs 32. This construction also greatly reduces cost by employing mirror image blanks which may be formed by the identical apparatus.

I claim:

1. A collapsible receptacle adapted to be received in the cargo carrying portion of a station wagon or like vehicle, the walls of said receptacle being rotatable from planes parallel to the base of said receptacle to planes normal to the base of said receptacle comprising:
   (a) a rectangular base,
   (b) side walls coextensively joined to opposite edges of said base and being rotatable about said edges,
   (c) a front wall coextensively joined to the front edge of said base and being rotatable about said edge,
   (d) means coextensively connecting each side edge of said front wall to each corresponding side wall, said means permitting said front wall to be in a plane substantially normal to the base of said receptacle only when both said side walls are in planes substantially normal to said base and permitting said front wall to be in a plane substantially parallel to said base only when both said side walls are in planes substantially parallel to said base,
   (e) collapsible web means associated with each side wall, each of said web means being coextensively connected to the rear edge of said side wall and the side edge of said rear wall, said web means being in extended orientation when said rear wall is in the plane of said base and being in collapsed orientation when said rear wall is in an upright position in a plane normal to said base, whereby said rear wall may be raised and lowered while said side and front walls are in upright position.

2. The receptacle of claim 1 further comprising releaseable fastening means for maintaining said rear wall in the upright position.

3. The receptacle of claim 2 wherein said fastening means comprise snap fastener means mounted at spaced apart points on the exterior of said rear wall; flexible strap means mounted on each side wall, each strap carrying a mating snap fastener to those on said rear wall and one of said strap means carrying a mating snap fastener to the fastener on the other of said straps; whereby said rear wall may be releaseably held in the upright position by said fastening means and the same fastening means may be employed to releaseably maintain said receptacle in collapsed orientation.

4. The receptacle of claim 2 further comprising reinforcing means extending along the length of said side walls.

5. The receptacle of claim 4 further comprising handle means on said side walls.

6. A one piece blank for fabricating a collapsible receptacle by the assembly, in partially overlapping relationship, of mirror images of said blank, said blank comprising:
   (a) a rectangular base forming portion having a length equal to the length of said receptacle and a width greater than one half of the width of said receptacle and no greater than the width of said receptacle,
   (b) a rear wall forming portion coextensive with one end of said base forming portion and defined therefrom by a crease line,
   (c) a front wall forming portion extending from the opposite end of said base forming portion and defined therefrom by a crease line,
   (d) a side wall portion coextensive with a side edge of said base forming portion and defined therefrom by a crease line,
   (e) a tab member extending from said front wall forming portion, said tab member being adjacent to and separate from said side wall portion and being defined from said front wall portion by an extension of said third mentioned crease line,
   (f) a crease line in said front wall forming portion extending from the intersection of said second mentioned crease line and said third mentioned crease line to the upper edge of said front wall forming portion at a point before the centerline of said receptacle,
   (g) a web forming portion adjacent said side wall portion and said rear wall forming portion and being defined from the former by an extension of said first mentioned crease line and from the latter by an extension of said third mentioned crease line, and
   (h) a crease line extending from the intersection of said first and third mentioned crease lines to an edge of said web forming portion.

7. The blank of claim 6 further comprising a reinforcement forming member adjacent the outer edge of said side wall portion and defined therefrom by a crease line parallel to said third mentioned crease line.

8. The blank of claim 7 further comprising a hand hold cut in said side wall portion at a point separate from said reinforcement forming member by a distance at least equal to the width of said reinforcement forming member.

References Cited

UNITED STATES PATENTS

| | | | |
|---|---|---|---|
| 601,976 | 4/1898 | Murray. | |
| 940,941 | 11/1909 | Putnam | 229—31 |
| 1,102,445 | 7/1914 | Schwab | 229—41 |
| 2,141,438 | 12/1938 | Hirsch | 229—41 |
| 2,657,849 | 11/1953 | Paul et al. | 229—30 |

DAVID M. BOCKENEK, Primary Examiner

U.S. Cl. X.R.

229—23, 41